(12) United States Patent
Ballestad et al.

(10) Patent No.: US 10,255,879 B2
(45) Date of Patent: Apr. 9, 2019

(54) METHOD AND APPARATUS FOR IMAGE DATA TRANSFORMATION

(71) Applicant: DOLBY LABORATORIES LICENSING CORPORATION, San Francisco, CA (US)

(72) Inventors: Anders Ballestad, Vancouver (CA); Andrey Kostin, Ithaca, NY (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 15/902,846

(22) Filed: Feb. 22, 2018

(65) Prior Publication Data

US 2018/0182352 A1    Jun. 28, 2018

Related U.S. Application Data

(63) Continuation of application No. 14/943,821, filed on Nov. 17, 2015, now Pat. No. 9,916,809, which is a continuation of application No. 13/984,903, filed as application No. PCT/US2012/029189 on Mar. 15, 2012, now Pat. No. 9,224,363.
(Continued)

(51) Int. Cl.
*G09G 5/02* (2006.01)
*H04N 1/60* (2006.01)
*H04N 1/62* (2006.01)
*H04N 9/67* (2006.01)
(Continued)

(52) U.S. Cl.
CPC ............. *G09G 5/02* (2013.01); *G06T 11/001* (2013.01); *H04N 1/6027* (2013.01); *H04N 1/6088* (2013.01); *H04N 1/62* (2013.01); *H04N 9/67* (2013.01); *H04N 9/68* (2013.01); *G09G 2320/0276* (2013.01); *G09G 2320/066* (2013.01); *G09G 2320/0666* (2013.01)

(58) Field of Classification Search
None
See application file for complete search history.

(56) References Cited

U.S. PATENT DOCUMENTS 5,276,779 A    1/1994  Staff
5,446,504 A    8/1995  Wada
(Continued)

FOREIGN PATENT DOCUMENTS

CN    101610420    12/2009
GB    2408872    6/2005
(Continued)

OTHER PUBLICATIONS

Adobe Photoshop "Adobe Photoshop 5.0 Limited Edition, Chapter 4: Making Color and Tonal Adjustments" Jan. 1, 1998, -pp. 67-89.
(Continued)

*Primary Examiner* — Yingchun He

(57) ABSTRACT

Image data is transformed for display on a target display. A sigmoidal transfer function provides a free parameter controlling min-tone contrast. The transfer function may be dynamically adjusted to accommodate changing ambient lighting conditions. The transformation may be selected so as to automatically adapt image data for display on a target display in a way that substantially preserves creative intent embodied in the image data. The image data may be video data.

14 Claims, 5 Drawing Sheets

Related U.S. Application Data

(60) Provisional application No. 61/567,784, filed on Dec. 7, 2011, provisional application No. 61/453,107, filed on Mar. 15, 2011.

(51) Int. Cl.
*H04N 9/68* (2006.01)
*G06T 11/00* (2006.01)

(56) References Cited

U.S. PATENT DOCUMENTS

| | | | |
|---|---|---|---|
| 6,075,888 | A | 6/2000 | Schwartz |
| 6,229,624 | B1 | 5/2001 | Gilman |
| 6,285,798 | B1 | 9/2001 | Lee |
| 6,335,983 | B1 | 1/2002 | McCarthy |
| 6,438,264 | B1 | 8/2002 | Gallagher |
| 6,529,212 | B2 | 3/2003 | Miller |
| 6,757,010 | B2 | 6/2004 | Fasciano |
| 6,844,881 | B1 | 1/2005 | Chek |
| 6,989,859 | B2 | 1/2006 | Parulski |
| 7,158,673 | B2 | 1/2007 | Nakabayashi |
| 7,289,663 | B2 | 10/2007 | Spaulding |
| 7,492,375 | B2 | 2/2009 | Toyama |
| 7,599,551 | B2 | 10/2009 | Takahashi |
| 7,616,233 | B2 | 11/2009 | Steinberg |
| 7,746,411 | B1 | 6/2010 | Balram |
| 7,809,200 | B2 | 10/2010 | Aguilar |
| 7,844,140 | B2 | 11/2010 | Fujita |
| 8,289,412 | B2 | 10/2012 | Banterle |
| 8,483,479 | B2 | 7/2013 | Kunkel |
| 8,525,933 | B2 | 9/2013 | Atkins |
| 8,831,343 | B2 | 9/2014 | Kunkel |
| 2001/0050757 | A1 | 12/2001 | Yoshida |
| 2002/0024529 | A1 | 2/2002 | Miller |
| 2002/0041287 | A1 | 4/2002 | Engeldrum |
| 2002/0075136 | A1 | 6/2002 | Nakaji |
| 2002/0080245 | A1 | 6/2002 | Parulski |
| 2003/0038957 | A1 | 2/2003 | Sharman |
| 2003/0095197 | A1 | 5/2003 | Wheeler |
| 2003/0235342 | A1 | 12/2003 | Gindele |
| 2004/0057061 | A1 | 3/2004 | Bochkarev |
| 2004/0071362 | A1 | 4/2004 | Curry |
| 2004/0183813 | A1 | 9/2004 | Edge |
| 2005/0050043 | A1 | 3/2005 | Pyhalammi |
| 2005/0123267 | A1 | 6/2005 | Tsumagari |
| 2006/0020624 | A1 | 1/2006 | Svendsen |
| 2006/0187233 | A1 | 8/2006 | Diefenbaugh |
| 2006/0294125 | A1 | 12/2006 | Deaven |
| 2007/0065005 | A1 | 3/2007 | Cha |
| 2007/0080974 | A1 | 4/2007 | Edge |
| 2007/0127093 | A1 | 6/2007 | Kuno |
| 2007/0171441 | A1 | 7/2007 | Granger |
| 2007/0262985 | A1 | 11/2007 | Watanabe |
| 2007/0268411 | A1 | 11/2007 | Rehm |
| 2008/0080767 | A1 | 4/2008 | Cho |
| 2008/0088857 | A1 | 4/2008 | Zimmer |
| 2008/0094515 | A1 | 4/2008 | Gutta |
| 2008/0170031 | A1 | 7/2008 | Kuo |
| 2008/0186707 | A1 | 8/2008 | Ku |
| 2008/0225180 | A1 | 9/2008 | Callway |
| 2008/0297815 | A1 | 12/2008 | Dalrymple |
| 2009/0002561 | A1 | 1/2009 | Barnhoefer |
| 2009/0027558 | A1 | 1/2009 | Mantiuk |
| 2009/0092325 | A1 | 4/2009 | Brown |
| 2009/0115901 | A1 | 5/2009 | Winter |
| 2009/0141178 | A1* | 6/2009 | Kerofsky ............ G09G 3/3426 348/700 |
| 2009/0161017 | A1 | 6/2009 | Glen |
| 2009/0174726 | A1 | 7/2009 | Ollivier |
| 2009/0195551 | A1 | 8/2009 | Quan |
| 2009/0201309 | A1 | 8/2009 | Demos |
| 2009/0267876 | A1 | 10/2009 | Kerofsky |
| 2009/0284554 | A1 | 11/2009 | Doser |
| 2010/0007599 | A1 | 1/2010 | Kerofsky |
| 2010/0008427 | A1 | 1/2010 | Chiu |
| 2010/0020242 | A1 | 1/2010 | Lammers |
| 2010/0073362 | A1 | 3/2010 | Ikizyan |
| 2010/0118008 | A1 | 5/2010 | Matsuoka |
| 2010/0128057 | A1 | 5/2010 | Doser |
| 2010/0149207 | A1 | 6/2010 | Madden |
| 2010/0150457 | A1 | 6/2010 | Angell |
| 2010/0158099 | A1 | 6/2010 | Kalva |
| 2010/0183071 | A1 | 7/2010 | Segall |
| 2010/0195901 | A1 | 8/2010 | Andraus |
| 2010/0226547 | A1 | 9/2010 | Criminisi |
| 2010/0231935 | A1 | 9/2010 | Takenaka |
| 2010/0271505 | A1 | 10/2010 | Zimmer |
| 2010/0289810 | A1 | 11/2010 | Doser |
| 2010/0289812 | A1 | 11/2010 | Kobayashi |
| 2010/0329646 | A1 | 12/2010 | Loeffler |
| 2011/0013208 | A1 | 1/2011 | Bhaskaran |
| 2011/0026824 | A1 | 2/2011 | Ishii |
| 2013/0076763 | A1 | 3/2013 | Messmer |

FOREIGN PATENT DOCUMENTS

| | | |
|---|---|---|
| JP | S55-140372 | 11/1980 |
| JP | 63-061591 | 3/1988 |
| JP | H06-169437 | 6/1994 |
| JP | H07-281633 | 10/1995 |
| JP | 10294853 | 11/1998 |
| JP | 11-355798 | 12/1999 |
| JP | 2001-184016 | 7/2001 |
| JP | 2001-251640 | 9/2001 |
| JP | 2002-092655 | 3/2002 |
| JP | 2002-359773 | 12/2002 |
| JP | 2003-052050 | 2/2003 |
| JP | 2003-248467 | 9/2003 |
| JP | 2003-259154 | 9/2003 |
| JP | 2003-337580 | 11/2003 |
| JP | 2003-346137 | 12/2003 |
| JP | 2004-163823 | 6/2004 |
| JP | 2004-212598 | 7/2004 |
| JP | 2006-145577 | 6/2006 |
| JP | 2006-343957 | 12/2006 |
| JP | 2007-318256 | 12/2007 |
| JP | 2007-325134 | 12/2007 |
| JP | 2007-336531 | 12/2007 |
| JP | 2009-017200 | 1/2009 |
| JP | 2009-147580 | 7/2009 |
| RU | 2413383 | 2/2011 |
| TW | 508560 | 11/2002 |
| WO | 2010/024782 | 3/2010 |
| WO | 2010/086493 | 8/2010 |
| WO | 2010/104624 | 9/2010 |
| WO | 2012/118961 | 9/2012 |

OTHER PUBLICATIONS

Cadik, M. et al. "Evaluation of HDR Tone Mapping Methods Using Essential Perceptual Attributes" Computers and Graphics 32 (2008) 330-349.

Chou, T.R. et al. "Color Calibration of Recovering High Dynamic Range Images" International Conference on Computer Science and Software Engineering, CSSE 2008, v. 6, p. 286-289.

Drago, F. et al. "Adaptive Logarithmic Mapping for Displaying High Contrast Scenes" Eurographics, vol. 22 (2003) No. 3.

Farbman, Zeev et al. "Edge-Preserving Decompositions for Multi-Scale Tone and Detail Manipulation" ACM Transactions on Graphics: vol. 27, No. 3, Aug. 11, 2008, pp. 1-10.

Gatta, C. et al. "Perceptually Inspired HDR Images Tone Mapping with Color Correction" International Journalof Imaging Systems and Technology, v 17, No. 5, pp. 285-294, 2007.

Green, P. et al, "How Scalable are Gamut Mapping Algorithms?," Proc. SPIE 5293, Color Imaging IX: Processing, Hardcopy, and Applications, San Jose, CA, Jan. 18, 2004.

Kang, Sing Bing et al. "High Dynamic Range Video" SIGGRAPH ACM, 2003, pp. 319-325.

Lee, S. et al. "Dynamic Range Compression Algorithm for Mobile Display Devices Using Average Luminance Values" ISIC-2009, 12th International Symposium on Integrated Circuits Proceedings, p. 340-343, Dec. 14, 2009.

(56) References Cited

OTHER PUBLICATIONS

Li, Xiao-Guang et al. "Algorithm for Visualization of High Dynamic Range Images" Application Research of Computers v. 24, n. 11, 303-5, Nov. 2007.

Mantiuk, R. et al. "A Perceptual Framework for Contrast Processing of High Dynamic Range Images" ACM Trans. Appl Percept. vol. 3, No. 3, 2006.

Mantiuk, R. et al. "Display Adaptive Tone Mapping" SIGGRAPH 2008 ACM papers, pp. 1-10.

Mantiuk, R. et al. "High Dynamic Range Image and Video Compression—Fidelity Matching Human Visual Performance" Source: Proc. 2007 IEEE International Conference on Image Processing.

Pattanaik, S. et al. "Adaptive Gain Control for High Dynamic Range Image Display" Proc. of the 18th Spring Conference on Computer Graphics, 2002, pp. 83-87.

Pouli, T. et al. "Progressive Histogram Reshaping for Creative Color Transfer and Tone Reproduction" Proc. of the 8th International Symposium on Non-Photorealistic Animation and Rendering, 2010, pp. 81-90, published by ACM.

Raffin, M. et al. "Tone Mapping and Enhancement of High Dynamic Range Images Based on a Model of Visual Perception" Proc. of the Tenth IASTED International Conference on Computer Graphics and Imaging, 2008, pp. 190-195.

Reinhard, E. et al. "Color Imaging" SIGGRAPH ACM, 2009, pp. 1-239.

Reinhard, E. et al. "Photographic Tone Reproduction for Digital Images", ACM Transactions on Graphics, pp. 267-276, Jul. 2002, Proc. of SIGGRAPH 2002.

Rempel, A.G. et al. "Video Viewing Preferences for HDR Displays Under Varying Ambient Illumination" Proc. of the 6th Symposium on Applied Perception in Graphics and Visualization, 2009, pp. 45-52.

Shaw Kevin, "Color Correction, Enhancement and Creativity: Advancing the Craft" Oct. 2005.

Smith, K. et al. "Beyond Tone Mapping: Enhanced Depiction of Tone Mapped HDR Images" vol. 25, 2006, No. 3.

Stauder J., et al, "Gamut ID," IET 4th European Conference on Visual Media Production (CVMP 2007), Jan. 2007 p. 22.

Tamburrino, D. et al. "Digital Camera Workflow for High Dynamic Range Images Using a Model of Retinal Processing" Proc. of SPIE—The International Society for Optical Engineering, v. 6817, 2008.

Wang, J. et al. "Retinex-Based Color Correction for Displaying High Dynamic Range Images" International Conference on Signal Processing Proceedings, p. 1021-1024, 2010 10th International Conference.

Ward, G. et al. "High Dynamic Range Imaging & Image-Based Lighting" SIGGRAPH 2008 ACM, pp. 1-137.

Ward, G. et al. "JPEG-HDR: A Backwards-Compatible, High Dynamic Range Extension to JPEG" Submitted to 13th Color Imaging Conference, Nov. 2005.

Wei, X. et al. "Performance Evaluation of Color Correction Approaches for Automatic Multi-View Image and Video Stitching" Computer Vision and Pattern Recognition, 2010 IEEE Conference.

Zhang, J. et al. "An Adaptive Tone Mapping Algorithm for High Dynamic Range Images" Computational Color Imaging: Second International Workshop, Mar. 26-27, 2009, pp. 207-215.

"Color User Manual" by Apple Inc., Mar. 26, 2007.

* cited by examiner

METHOD AND APPARATUS FOR IMAGE DATA TRANSFORMATION

CROSS REFERENCE TO RELATED APPLICATIONS

This application is a continuation of U.S. patent application Ser. No. 14/943,821, filed on Nov. 17, 2015, which is a continuation of U.S. patent application Ser. No. 13/984,903, filed on Aug. 12, 2013 (now U.S. Pat. No. 9,224,363), which is the national stage application for PCT Patent Application Ser. No. PCT/US2012/029189, filed on 15 Mar. 2012 which claims the benefit of priority of U.S. Provisional Patent Application Ser. No. 61/453,107, filed on Mar. 15, 2011, and U.S. Provisional Patent Application Ser. No. 61/567,784, filed on Dec. 7, 2011, all of which are hereby incorporated by reference in their entirety.

TECHNICAL FIELD

The invention relates to displaying and processing images. The invention relates specifically to methods and apparatus involving tone and/or gamut mapping. Methods and apparatus as described herein may be applied to provide quality images on destination displays while preserving creative intent. The invention may be embodied, for example, in electronic displays such as televisions, computer monitors, media players, video capable portable telephones and other portable devices, specialized displays such as virtual reality displays, advertising displays, and the like as well as to upstream image processing equipment such as set top boxes, access points and the like.

BACKGROUND OF THE INVENTION

Patent publications in the general field of this invention include the following:
US20010050757;
US20020075136;
US20020080245;
US20070127093;
US20080094515;
US20080170031;
US20080186707;
US20090201309;
US20090267876;
US20100007599;
US201000118008;
U.S. Pat. No. 7,158,673;
U.S. Pat. No. 6,989,859;
U.S. Pat. No. 5,276,779; and
JP2002092655.

The creator of a video production or other image (for example a director, colorist, or the like) may set tones and colors of pixels in the image so that, when viewed, the image has a desired appearance which agrees with the creator's creative intent. For example, a creator may wish some scenes to have a darker, more oppressive, feel than others. The creator may wish certain features depicted in a scene to stand out or to be less prominent. Adjusting tones and colors of pixels in an image may include performing color grading (or 'color timing') on the source video data. Color grading may be performed using a hardware/software system that permits a user to change the video data in various ways to achieve a desired appearance.

Various display technologies are now available. For example, there are plasma displays, LCD displays backlit by a variety of types of light sources such as LEDs of various types, fluorescent lamps or high-intensity incandescent lamps, CRT-based displays, digital cinema displays, etc. A particular display combines display hardware with video signal processing components that receive video signals and drive display hardware to display video content of the video signals.

Different displays may vary significantly with respect to features such as:
the color gamut that can be reproduced by the display;
the maximum brightness achievable;
contrast ratio;
resolution;
acceptable input signal formats;
color depth;
white level;
black level;
white point;
grey steps;
etc.

Consequently, the same image content may appear different when played back on different displays. Image content that matches a creator's creative intent when displayed on some displays may depart from the creator's creative intent in one or more ways when viewed on other displays.

Some current displays can outperform displays that were state-of-the-art at a time when certain content was created in one or more aspects. For example, new displays may be capable of providing images that have brighter highlights, greater contrast, and/or wider color gamuts than older displays. It can be desirable to take advantage of these improved capabilities without departing significantly from the creative intent embodied in the content being viewed.

It may be desirable to play video content created to take advantage of high-performance displays on legacy displays or displays that have lower capabilities. It would be desirable to provide methods and apparatus for adapting the appearance of video and other images displayed on different displays to preserve as much as possible a creative intent embodied in the image data.

The perception of color and luminance can be affected by ambient conditions. Video or other images presented under theater conditions (low ambient lighting) may be perceived by viewers significantly differently than the same video or other images would be perceived when viewed under conditions with significant ambient light. Further, the characteristics (such as the color temperature) of ambient light can affect a viewer's perception of video content. It would be desirable to display video or other images taking into account the environment in which the content is being viewed to preserve as much as possible a creative intent embodied in the video or other images.

There is a need to provide viewers of images (including still and/or video images) with viewing experiences that exploit the capabilities of displays on which they view the images. There remains a need for apparatus and methods which may be applied to adjust image data such that video or other image content encoded in the image data has a desired appearance when played.

SUMMARY OF THE INVENTION

The invention has a range of aspects. These include, without limitation, apparatus which comprises gamut transformation functionality; method for gamut transformation, methods for adapting display of image content to take account of ambient lighting conditions; program products comprising computer readable code which, when executed by a data processor causes the data processor to execute a method according to the invention.

One non-limiting aspect provides apparatus comprising a pixel coordinate mapping unit that is configured to transform image data according to a transfer function. The transfer function is characterized by a plurality of anchor points and a free parameter. The transfer function has a mid-range slope controlled by the free parameter. Transformations at the anchor points are not affected by the free parameter. Such apparatus can be useful for transforming color-graded content for display on a particular target display, for example.

In some embodiments the apparatus comprises or receives a signal from an ambient light sensor and a circuit connected to receive an ambient-lighting signal from the ambient light sensor is configured to control one or more of the free parameter and a coordinate of one of the anchor points based at least in part on the ambient-lighting signal.

In some embodiments the image data comprises sets of pixel values for pixels in an image. The sets of pixel values comprise color values for each of a plurality of primary colors (for example, values corresponding to red, green and blue primary colors). The apparatus comprises a plurality of the pixel coordinate mapping units each connected to transform a corresponding one of the color values. The parameters for the transfer functions in the different coordinate mapping units may be the same or different. With properly selected different parameters the transformations may perform color correction as well as gamut translation.

Another aspect of the invention comprises methods for mapping image data for display on a target display. The methods comprise transforming pixel values of the image data to corresponding transformed pixel values according to a transfer function. The transfer function is characterized by a plurality of anchor points and a free parameter. The transfer function has a mid-range slope controlled by the free parameter. Transformations of pixel values corresponding to the anchor points are not affected by the free parameter. In some embodiments, one or more of the free parameter and the location of a mid-range anchor point are automatically changed to account for ambient lighting and/or adaptation of viewers' visual systems.

Another aspect comprises methods for mapping image data for display on a target display by combining a global tone-mapping transformation with a local multi-scale tone mapping operation.

Another aspect provides color manipulation apparatus. The apparatus may comprise a workstation for modifying still or video images for example. The apparatus may be applied for modifying color values in image data. The color manipulation apparatus comprises a first memory or input for source image data and a second memory or output for modified image data. A pixel coordinate mapping unit is connected to access the first memory or input and configured to transform the source image data according to a transfer function characterized by a plurality of anchor points and a free parameter. The transfer function has a mid-range slope controlled by the free parameter, wherein transformations at the anchor points are not affected by the free parameter to yield the modified image data and to provide the modified image data to the second memory or output. A user input is configured to accept from a user a value for the free parameter. A display connected to display the modified image data. A user may adjust the value of the free parameter to obtain a desired appearance of the image displayed on the display.

Further aspects of the invention and features of specific embodiments of the invention are described below.

BRIEF DESCRIPTION OF THE DRAWINGS

The accompanying drawings illustrate non-limiting embodiments of the invention.

DESCRIPTION OF THE INVENTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
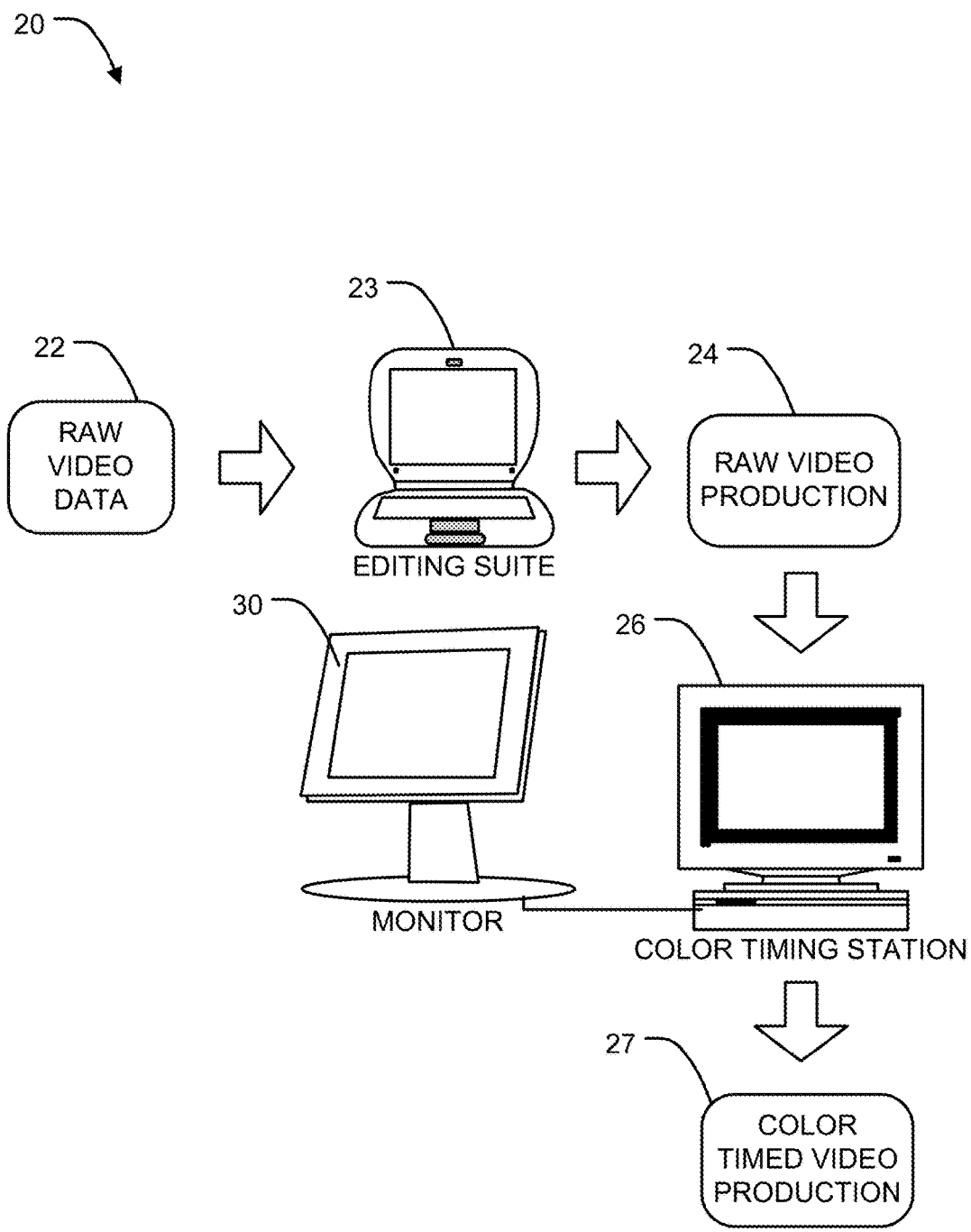
FIG. 1 is a schematic depiction of a video distribution pipeline.

FIG. 1 shows schematically a video distribution pipeline 20. Raw video data 22 is acquired and edited at an editing suite 23 to provide a raw video production 24. Tones and/or colors in the raw video production are adjusted at a color timing station 26 by a colorist (e.g. a human who uses tools provided by the color timing station by way of a suitable user interface) to achieve a color timed video production 27. Color timing station 26 includes a professional monitor 30 on which the colorist views the video production. Using tools and controls provided by color timing station 26, the colorist adjusts tones and/or colors of all or parts of the images which make up the video production to achieve an overall appearance which, when viewed on display 30, matches the colorist's artistic intent.

If all viewers of color timed video production 27 watched the video production on a display identical to display 30 under ambient conditions identical to those experienced by the colorist then, excepting individual variations in the human perception of images, the viewers would all see the video production exactly as intended by the colorist (i.e. in a manner true to the colorist's artistic intent). Given the very wide range of displays that are in use, it is unrealistic to expect that viewers will all have the same display or even that displays on which different viewers will view a video production will have similar characteristics such as maximum brightness, black level and color gamut.

One aspect of the invention provides mapping methods and apparatus that may be applied automatically to map tones and/or colors from image data such as, for example, color timed video production 27 for display on a particular destination display in a manner that closely replicates the viewing experience of the colorist.

In some embodiments, the mapping methods and apparatus provide direct control over one or more of:

average image brightness (adaptation point);
mid-tone local contrast;
color saturation;
level at which input black is displayed; and
level at which input white is displayed.
These parameters affect the viewing experience.

Figure 2:
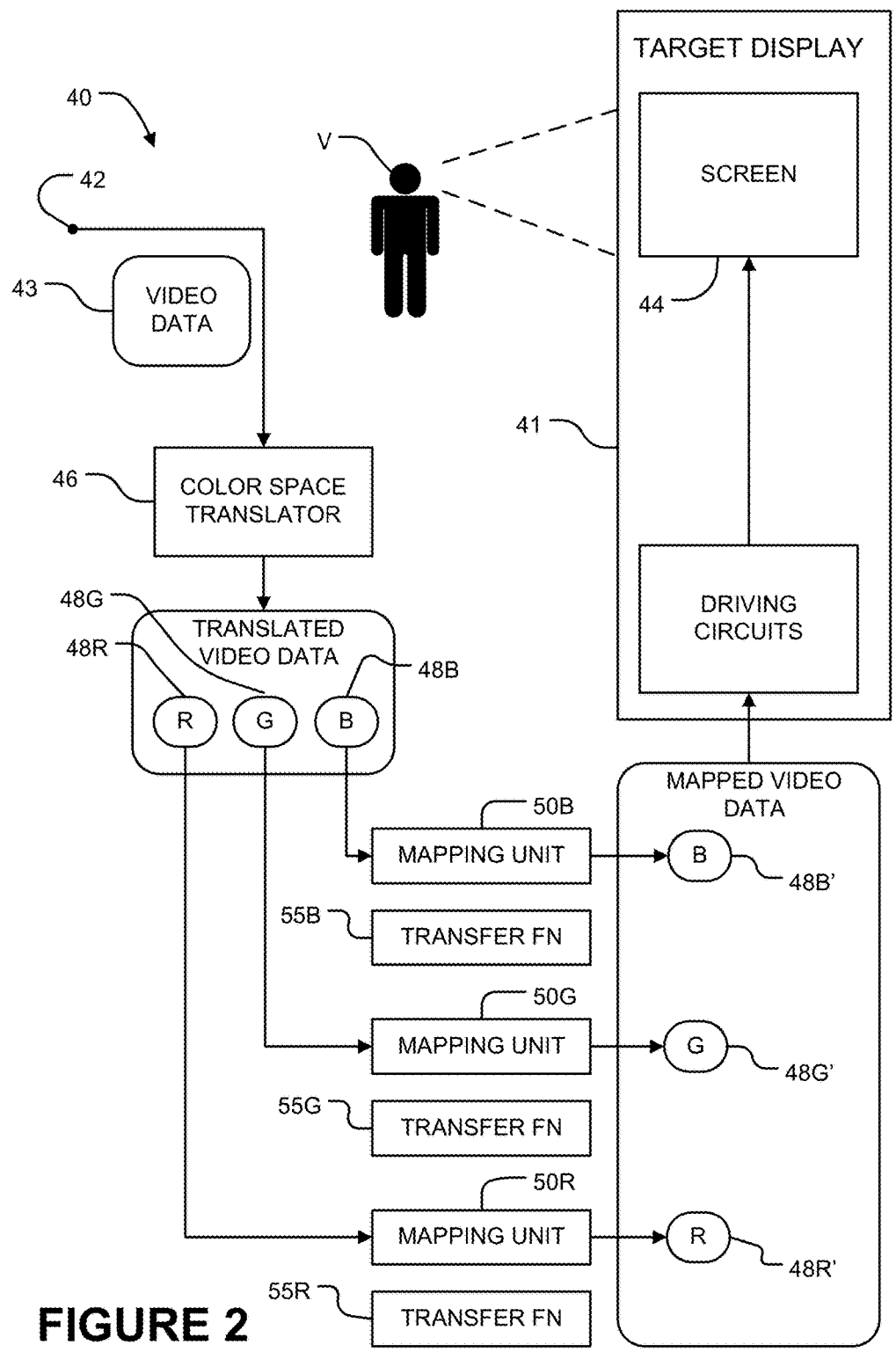
FIG. 2 shows apparatus according to an example embodiment of the invention.

FIG. 2 shows apparatus 40 according to an example embodiment of the invention. In this example, apparatus 40 has an input 42 for receiving video data 43 to be displayed on a screen 44 of a target display 41 for viewing by a viewer V. Video data 43 may comprise color-timed video data embodying the intent of a creator. Apparatus 40 comprises a color space translator 46 that translates pixel values for video data 43 into a color space that is native to target display 41. In the illustrated example embodiment, the native color space of target display 41 is an RGB color space, which specifies colors in terms of the intensities of primary colors of target display 41.

Color space translator 46 may comprise, for example, a matrix multiplier that multiplies a vector of pixel values in video data 43 by a 3×3 matrix to yield a vector of display 41 native color space values (e.g., RGB values). The transfer matrix may be specified taking into account the primaries and white point of target display 41. In some embodiments, color space translator 46 may be configured to apply a color space transformation matrix without scaling for peak luminance. As explained below, this may make selection of parameters for subsequently image processing operations more intuitive.

In the following example, pixel values in video data 43 are represented in an XYZ color space and color space translator 46 performs a translation from XYZ color space into positive RGB values. The invention is not limited to color data presented in an XYZ color space. Video data 43 may be presented in any suitable color space.

Negative RGB values may result for translations of combinations of pixel values that are out-of-gamut (e.g. colors that cannot be reproduced using any available combination of the primary colors used by the display). Any negative RGB values generated by color space translator 46 may be clipped to a low non-negative value. In the alternative, out-of-gamut pixel values may be mapped to in-gamut pixel values prior to the translation (e.g., according to a mapping within the color space of video data 43). This may be performed by a separate mapping unit or by a component of color space translator 46 for example.

After being processed by color space translator 46 video data 43 comprises values 48R, 48G, and 48B which respectively correspond to red, green and blue (RGB) primaries of target display 41.

Each of values 48R, 48G, and 48B is independently mapped to a new value by a mapping unit 50. Mapping units 50R, 50G, and 50B are shown. Each mapping unit maps a corresponding input value received from color space translator 46 to a transformed value. In the illustrated embodiment, the transformed values are indicated by 48R' 48G' and 48B' respectively.

Each mapping unit 50 maps its input value to an output value according to a transfer function 55. Advantageously, transfer function(s) 55 may be characterized by a plurality of fixed points, which may be referred to as 'anchor points', and a free parameter that adjusts a slope of the transfer function in a mid-range region. This slope corresponds to mid-range contrast. Adjustment of the free parameter provides a means for controlling mid-range contrast. The transfer function may be linear or approach linearity in the mid-range region.

Figure 3:
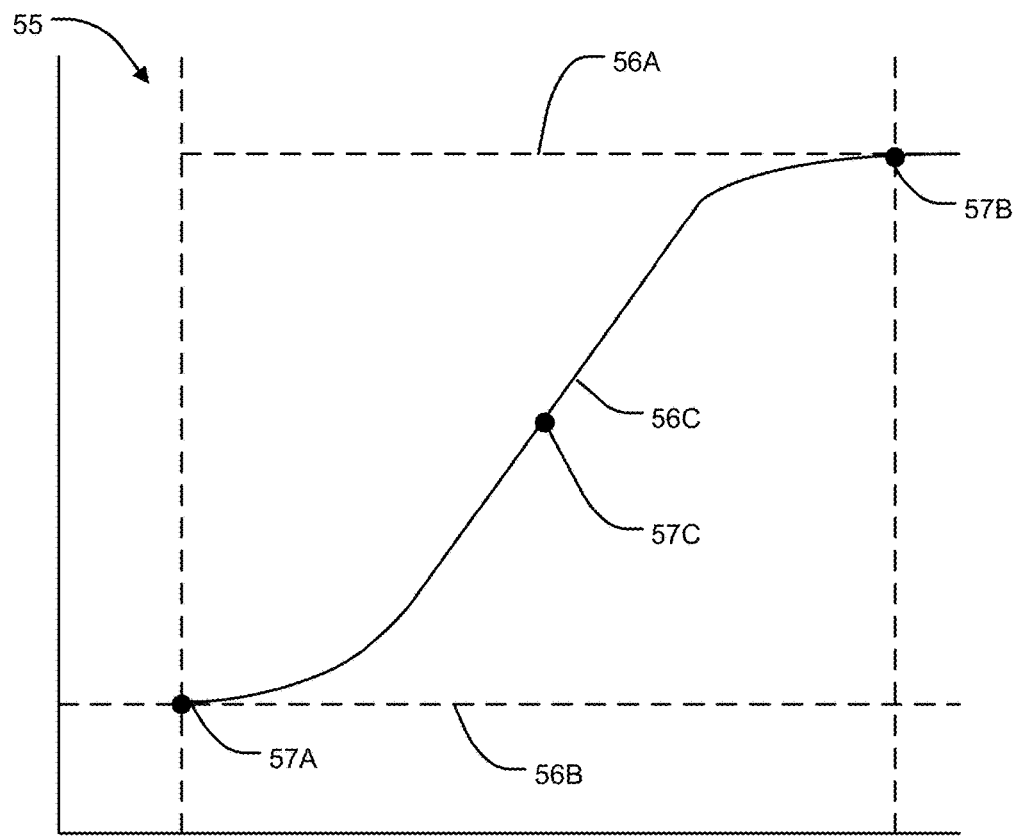
FIG. 3 illustrates an example transfer function.

FIG. 3 shows an example transfer function. In FIG. 3, input values are indicated on the horizontal axis and output values are indicated on the vertical axis. Each axis has a logarithmic scale. Transfer function 55 is characterized by a maximum value 56A for output values, a minimum value 56B for output values and a substantially linear mid-tone region 56C. The transfer functions 55R, 55G and 55B applied to red, blue, and green channel signals by mapping units 50A, 50B and 50C may be identical or different. Mapping units 50A, 50B and 50C may be completely independent or may share hardware and/or software components.

In an example embodiment, transfer function 55 is given by the following equation:

$$V' = \frac{C_1 + C_2 V^n}{1 + C_3 V^n} \quad (1)$$

where $C_1$, $C_2$, and $C_3$ are constants, V is the input value for the color channel, V' is the output value for the color channel, and n is a parameter. The transfer function of Equation (1) is an example of a parameterized sigmoidal tone curve function.

Other parameterized transfer functions may be used in the alternative. In some embodiments the transfer function includes parameters that provide control over one or more of low-end slope, high-end slope, and "sharpness" of the roll-off at the top and bottom ends of the transfer function.

Figure 4:
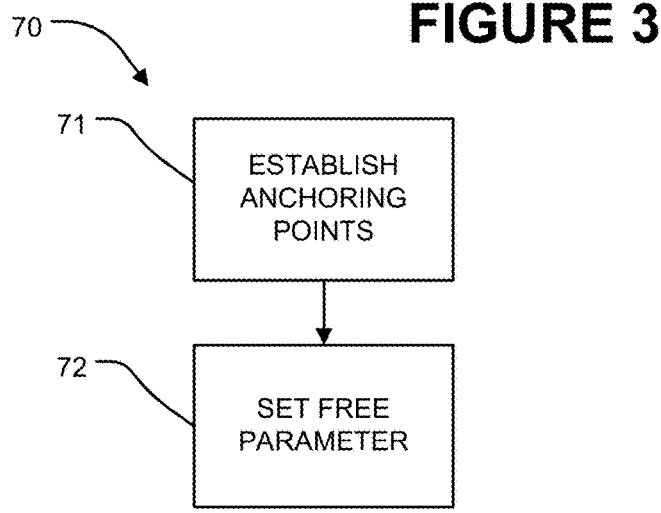
FIG. 4 is a flow chart illustrating a method which uses information about a target display and input image data to determine appropriate values for parameters defining a transfer function.

One method for establishing values for the parameters in Equation (1) in a specific case is illustrated by the method 70 of FIG. 4. Method 70 uses information about the target display and information about a display used in color-timing or approving the input video data (a 'color-timing display') to determine appropriate values for the parameters of Equation (1). Block 71 identifies three luminance anchor points on curve 55. A first anchor point 57A has horizontal and vertical coordinates respectively equal to black levels of the color-timing display and the target display. In some embodiments information about the color-timing display is inferred from the input signal. For example, a black level for the color-timing display may be inferred from the input signal by taking a small percentile (e.g. the 0.1 percentile) of the luminance channel in the input signal. A black level for the target display is the black level for the target display.

A second anchor point 57B has as its horizontal coordinate a white level for the color-timing display and, as a vertical coordinate, a white point for the target display. For example, a white point for the color-timing display may be inferred from the input signal as the maximum value of any color channel in the input signal.

The position of a middle anchor point 57C affects the overall brightness of a displayed image (e.g. the 'key' of the image). Appropriate selection of mid-tone anchor point 57C facilitates the input image being perceived as being appropriately bright on the target display.

The horizontal location of point 57C may be set in various ways; these include the following:
calculating the geometric mean of the input luminance;
selecting a fixed value that would be perceived in the color-grading environment as being a suitable middle value. For example, in some embodiments this value could be set to a level such as 10.

The vertical value for point 57C may be based on a luminance level corresponding to middle grey for the target display. For example, in a display that can produce luminance values between 1 cd/m² and 400 cd/m², middle grey is approximately 20 cd/m² (which is logarithmically halfway between 1 and 400 cd/m²). An appropriate value for point 57C may therefore be a value corresponding to middle grey (about 20 cd/m² in this example). In embodiments where color space translator 46 is configured to apply a color space transformation matrix without scaling for peak luminance, a value of 20 will correspond to a middle grey of 20 cd/m².

In some embodiments, the mid-tone anchor point 57C is selected so as to make the ratio of the coordinate of the mid-tone anchor point to the coordinate of the white anchor point equal, within a desired factor, for both the input and output of the transfer function.

In some embodiments, different transfer functions for each of the RGB coordinates may be used to provide a transformation such that the white point of the video data is transformed to match the white point of the target display and/or target viewing environment. One way to achieve this is to express the white point of the input video data in terms of chromaticity coordinates (such as, for example, CIE x,y chromaticity coordinates) and to convert to scaled XYZ values given by the following equations:

$$X = \frac{x}{y} \quad (2)$$

$$Y = 1 \quad (3)$$

$$Z = \frac{1 - x - y}{y} \quad (4)$$

These XYZ values may subsequently be converted to the RGB color space for the target display to yield a white point for the input data which may be denoted as $(R, G, B)_{wp, in}$. In cases where the source and target white points are the same, both white points should be (111) in the normalized RGB coordinates. Coordinates for anchor points 57A, 57B, 57C for the red, green and blue channels can then be obtained by multiplying luminance anchor values by the white point values as follows:

$$(R,G,B)_{min,in} = Y_{min,in}(R,G,B)_{wp,in} \quad (5)$$

$$(R,G,B)_{max,in} = Y_{max,in}(R,G,B)_{wp,in} \quad (6)$$

$$(R,G,B)_{min,in} = Y_{min,in}(R,G,B)_{wp,in} \quad (7)$$

$$(R,G,B)_{min,out} = Y_{min,out}(R,G,B)_{wp,out} \quad (8)$$

$$(R,G,B)_{min,out} = Y_{min,out}(R,G,B)_{wp,out} \quad (9)$$

$$(R,G,B)_{min,out} = Y_{min,out}(R,G,B)_{wp,out} \quad (10)$$

where the subscript 'in' denotes the input image data, the subscript 'out' denotes the output data (i.e. the data being passed on for display); $(Y_{max,in}, Y_{max,out})$ are the unadjusted coordinates for anchor point 57B; $(Y_{min,in}, Y_{mid,out})$ are the unadjusted coordinates for anchor point 57A; and $(Y_{mid,in}, Y_{mid,out})$ are the unadjusted coordinates for anchor point 57C; and $(R, G, B)_{wp,out}$ are the RGB coordinates of the white point of the target display.

Equations (5) through (10) provide a set of three anchor points for each color channel. For example, anchor point 57A for the red color channel is given by $(R_{max,in}, R_{max,out})$; anchor point 57B for the red color channel is given by $(R_{min,in}, R_{min,out})$; and anchor point 57C for the red color channel is given by $(R_{mid,in}, R_{mid,out})$. Where the white points for the input video data and target display are not the same, the sets of anchor points will be different, this results in a different transfer function for each color channel.

The transfer function for each color channel of the form provided by Equation (1) may be obtained from the coordinates of the corresponding anchor points by performing the computation:

$$\begin{pmatrix} c_1 \\ c_2 \\ c_3 \end{pmatrix} = \frac{1}{x_3 y_3 (x_1 - x_2) + x_2 y_2 (x_3 - x_1) + x_1 y_1 (x_2 - x_3)} \quad (11)$$

$$\begin{pmatrix} x_2 x_3 (y_2 - y_3) & x_1 x_3 (y_3 - y_1) & x_1 x_2 (y_1 - y_2) \\ (x_3 y_3 - x_2 y_2) & (x_1 y_1 - x_3 y_3) & (x_2 y_2 - x_1 y_1) \\ (x_3 - x_2) & (x_1 - x_3) & (x_2 - x_1) \end{pmatrix} \begin{pmatrix} y_1 \\ y_2 \\ y_3 \end{pmatrix}$$

in which $x_1$, $x_2$ and $x_3$ are given by:

$$\begin{pmatrix} x_1 \\ x_2 \\ x_3 \end{pmatrix} = \begin{pmatrix} V_{min,in}^n \\ V_{mid,in}^n \\ V_{max,in}^n \end{pmatrix} \quad (12)$$

and $y_1$, $y_2$ and $y_3$ are given by:

$$\begin{pmatrix} y_1 \\ y_2 \\ y_3 \end{pmatrix} = \begin{pmatrix} V_{min,out} \\ V_{mid,out} \\ V_{max,out} \end{pmatrix} \quad (13)$$

One feature of the transfer functions described above is that n remains a free parameter. This permits the mid-tone contrast to be set to any desired level. It should be noted that the log-log slope at the mid-tone anchor point will differ slightly from the value of n if the mid-tone anchor point is not centered in the input and output ranges. However, the mid-tone contrast can be set by adjusting the value for n. A good starting point for the mid-tone contrast parameter, n, is 1. This value for n ensures that the mapped scene has substantially similar mid-range local contrast on the target display and in the original scene.

With transfer functions as given above, the display linear luminance values for each of the red, green and blue color channels can be expressed as follows:

$$R_{out} = \frac{c_{1R} + c_{2R} R_{in}^n}{1 + c_{3R} R_{in}^n} \quad (14)$$

$$G_{out} = \frac{c_{1G} + c_{2G} G_{in}^n}{1 + c_{3G} G_{in}^n} \quad (15)$$

$$B_{out} = \frac{c_{1B} + c_{2B} B_{in}^n}{1 + c_{3B} B_{in}^n} \quad (16)$$

These values may be used to drive the target display to display the image. In some embodiments, these values may be corrected for the target display's response to linear input values (e.g., normalized) before being used to drive the target display.

In some embodiments, normalized drive values $(R_{norm}, G_{norm}, R_{norm})$ for the target display are computed using the following relationships:

$$R_{norm} = \frac{R_{out} - R_{out,min}}{R_{out,max} - R_{out,min}} \quad (17)$$

$$G_{norm} = \frac{G_{out} - G_{out,min}}{G_{out,max} - G_{out,min}} \quad (18)$$

$$B_{norm} = \frac{B_{out} - B_{out,min}}{B_{out,max} - B_{out,max}} \quad (19)$$

Normalized values may be scaled to the range of driving signals for the target display (e.g., to the range 0-255 for an 8-bit target display).

Optionally, image colors may be enhanced by increasing color saturation. This may be done, for example, using the following relationships:

$$R' = \frac{aR_{norm} + bG_{norm} + cB_{norm}}{a + b\left(\frac{G_{norm}}{R_{norm}}\right)^S + c\left(\frac{B_{norm}}{R_{norm}}\right)^S} \quad (20)$$

$$G' = R'\left(\frac{G_{norm}}{R_{norm}}\right)^S \quad (21)$$

$$B' = R'\left(\frac{B_{norm}}{R_{norm}}\right)^S \quad (22)$$

Values for a, b and c in Equation (20) may be defined with reference to the elements of an inverse transform matrix M corresponding to the inverse color space translator 46 ($[X, Y, Z]^T = M*[R, G, B]$), specifically a may be given by: a=M(2, 1), b may be given by: b=M(2,2), and c may be given by: c=M(2,3). In Equations (20), (21) and (22), S is a free parameter. Values for S greater than 1 will cause the color saturation to be increased. Values for S less than 1 will cause the color saturation to be decrease (i.e. will cause colors to become more de-saturated).

When necessary or desired, the normalized drive values may be gamma corrected. This may be done, for example, according to the following relationships:

$$R_{corrected} = R_{norm}^{1/\gamma} \quad (23)$$

$$G_{corrected} = G'_{norm}^{1/\gamma} \quad (24)$$

$$B_{corrected} = B_{norm}^{1/\gamma} \quad (25)$$

where $\gamma$ is the display response. $\gamma$ is approximately 2.2 in some target displays. Where normalized drive values are re-saturated, gamma correction may be performed on re-saturated drive values (R', G' and B').

In some embodiments, image colors are re-saturated to restore, at least approximately, the saturation lost as a result of tonal compression. Where tonal compression is not constant across the range of tones in an image, different levels of tonal compression applied to different tones results in different colors being de-saturated to different degrees. In general, the greater the amount of tonal compression, the greater the amount of de-saturation. The amount of tonal compression may be quantified by the log-log slope of the tone-curve. As an illustrative example, the sigmoidal tone curve function plotted as curve 55 in FIG. 3 has a steeper log-log slope substantially in the substantially linear mid-tone region 56C than it does in the vicinity of maximum value 56A and minimum value 56B. Accordingly, tone compression going from the input (horizontal coordinate) to output (vertical coordinate) is greater in the vicinity of values 56A and 56B as compared with substantially linear mid-tone region 56C.

Applying a global re-saturation technique may re-saturate all pixels without regard to the amount of de-saturation caused by tonal compression. Some embodiments re-saturate transformed image data pixels according to the amount of tonal compression of the transformed image data pixels. Given that the amount of tonal compression corresponds to the log-log slope of the tone-curve, the amount of tonal compression for an input value $L_{in}$ may be determined as the derivative of the transfer function $L_{out} = f(L_{in})$ at the input value $L_{in}$. The log-log slope of this transfer function can be determined by setting $L_{in} = e^x$ and $L_{out} = e^y$ and solving for dy/dx, which represents the log-log slope. For a tone curve according to Equation (1) above, y may be expressed as:

$$y = \log(c_1 + c_2 e^{nx}) - \log(1 + c_3 e^{nx}) \quad (26)$$

and the log-log slope $c(L_{in})$ at any point on the tone curve may be calculated as the derivative of y with respect to x at $L_{in}$:

$$c(L_{in}) = \frac{dy}{dx} = \frac{nL_{in}^n(c_2 - c_1 c_3)}{(c_1 + c_2 L_{in}^n)(1 + c_3 L_{in}^n)} \quad (27)$$

For color channels R, G, and B, re-saturated drive values ($R_{re-sat}$, $G_{re-sat}$, $B_{re-sat}$) may be determined in terms of the normalized driving values as follows:

$$R_{re-sat} = R_{norm}\left(\frac{C_{in}}{L_{in}}\right)^{f(c)-c} \quad (28)$$

$$G_{re-sat} = G_{norm}\left(\frac{C_{in}}{L_{in}}\right)^{f(c)-c} \quad (29)$$

$$B_{re-sat} = B_{norm}\left(\frac{C_{in}}{L_{in}}\right)^{f(c)-c} \quad (30)$$

where f(c) is given as:

$$f(c) = \frac{(1 + k_1)c^{k_2}}{1 + k_1 c^{k_2}} \quad (31)$$

and $k_1$ and $k_2$ are constants. In some embodiments $k_1 = 1.6774$. In some embodiments, $k_1 = 1.677$. In some embodiments, $k_1 = 1.68$. In some embodiments (including without limitation some embodiments in which $k_1 = 1.6774$, $k_1 = 1.677$ or $k_1 = 1.68$) $k_2 = 0.9925$. In some embodiments (including without limitation some embodiments in which $k_1 = 1.6774$, $k_1 = 1.677$ or $k_1 = 1.68$) $k_2 = 0.992$. In some embodiments (including without limitation some embodiments in which $k_1 = 1.6774$, $k_1 = 1.677$ or $k_1 = 1.68$) $k_2 = 0.99$. It will be appreciated that acceptable results may be obtained using other values of $k_1$ and $k_2$. It will also be appreciated that re-saturated drive values, $R_{re-sat}$, $G_{re-sat}$ and $B_{re-sat}$ could be calculated based on the display linear luminance values for each of the red, green and blue color channels ($R_{out}$, $G_{out}$ and $B_{out}$).

It will be appreciated that the above-described technique for tonal compression-dependent re-saturation may be practiced in a manner that is parameter free (automatic).

Figure 5:
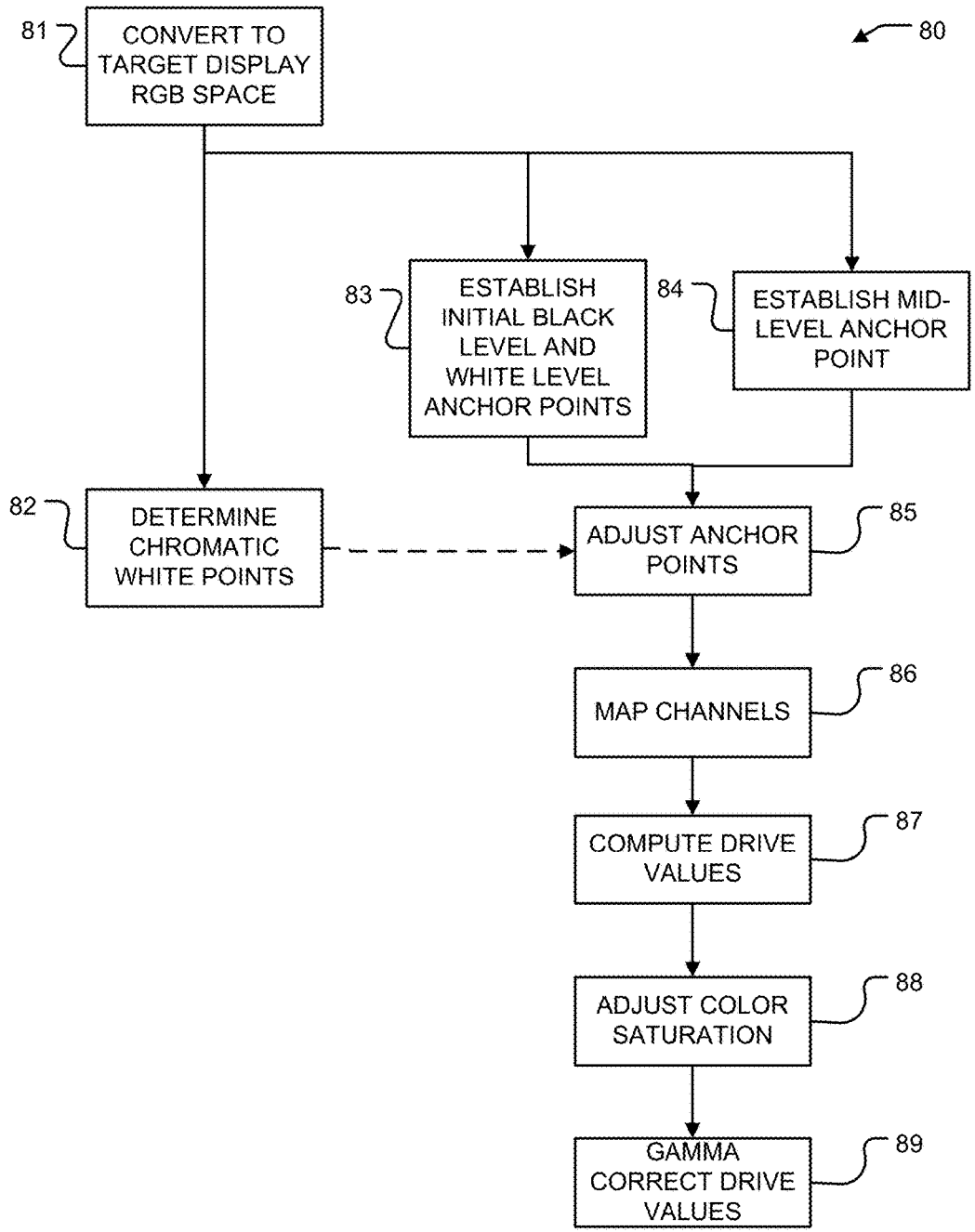
FIG. 5 is a flow chart illustrating a method for processing image data according to an example embodiment.

FIG. 5 is a flow chart illustrating a method 80 according to a further example embodiment. Method 80 incorporates a number of optional steps. In block 81 method 80 converts image data into a color space of the target display. In the illustrated example the target display has red- green- and blue-primaries and the color space is an RGB color space. Block 81 may comprise performing a transformation that takes into account the white point and primaries of the target display. Block 81 is optional in the event that the image data is already in the native color space of the target display.

Block 82 determines chromatic white points for the source and target. The white points may, for example, be represented as chromaticity coordinates in any suitable color space and converted to the native color space of the target display.

Block 83 establishes initial black level and white level anchor points for a transfer function. The initial anchor points may be set based on black and white levels for the source and for the target display.

Block 84 establishes an initial mid-tone anchor point for the transfer function. The mid-tone anchor point may be determined through analysis of the source image data (e.g. by determining a geometric mean of the luminance of the source image data) and determining characteristics of the target display (or characteristics of the target display and the current viewing environment at the target display).

Block 85 adjusts the anchor points based on the white points determined in block 82 (applying, for example Equations (5) to (10)).

Block 86 maps the image data using transfer functions specified by the adjusted anchor points determined in block 85.

Block 87 computes drive values for the target display based on the mapped image data from block 86.

Optional block 88 adjusts color saturation (block 88 may, for example, apply Equations (20) to (22) or (28) to (30)).

Block 89 gamma corrects the drive values.

The drive values produced through application of method 80 may be applied to drive the target display to display images and/or stored or transmitted for later display on the target display.

Apparatus and methods as described herein may be used to optimize a target display for specific ambient viewing conditions. Transfer functions of the general type described above may be shifted dynamically to accommodate changes in ambient lighting and the resulting changing adaptation level of the human visual system (HVS). The ideal luminance mid-point for the target display may be a function of the ambient light. The vertical component of the mid-tone anchor point may be selected based upon the ambient lighting conditions.

In some embodiments, fixing the middle anchor point 57C is done based in part on ambient lighting or on an estimated adaptation of viewers' eyes (which itself may be based at least in part on measured ambient lighting or on a combination of measured ambient lighting and past display content) as well as characteristics of the target display. For example, the vertical coordinate of point 57C may be adjusted based upon ambient lighting in the vicinity of the target display. For example, the vertical coordinate could be reduced to a lower luminance value if the display is in dark ambient lighting conditions (or the viewer's eyes are estimated to be dark-adapted) and the value could be increased to a higher value where the target display is in an environment having high ambient lighting (or the viewers' eyes are estimated to be adapted to brighter conditions).

In some embodiments, the amount of saturation adjustment (e.g., according to Equations (20), (21) and (22) and Equations (28), (29) and (30)) is based in part on ambient lighting or on an estimated adaptation of viewers' eyes (which itself may be based at least in part on measured ambient lighting or on a combination of measured ambient lighting and past display content) as well as characteristics of the target display. For example, the parameter S may be adjusted based upon ambient lighting in the vicinity of the target display or on a combination of measured ambient lighting and past displayed content. For example, the value of the parameter S could be set relatively lower if the display is in dark ambient lighting conditions (or the viewer's eyes are estimated to be dark-adapted) and the value could be set relatively higher where the target display is in an environment having high ambient lighting (or the viewers' eyes are estimated to be adapted to brighter conditions). Some embodiments provide a resaturation control unit that receives a signal from an ambient light sensor and/or signals containing past image content and/or signals indicative of the overall brightness of past displayed content. The resaturation control unit may be configured to set new values for a parameter (for example the parameter S) that affects an amount of resaturation based on the received signal(s).

In some embodiments, spectral characteristics of the ambient lighting are taken into account. For example, the location of points 57C in the transfer functions for each color channel may be separately set based in part on the amount of ambient lighting in a spectral range corresponding to the color channel.

Additionally or in the alternative, the slope of the transfer functions may be controlled based on ambient lighting (or estimates of the adaptation of viewers' eyes). Where ambient light is brighter, reflections from a display surface tend to raise the black level. This effectively reduces the range of the target display. Under high ambient lighting conditions (viewers' eyes are estimated to be light-adapted) the slope of the transfer curve in the mid-tone region may be reduced to provide an enhanced viewing experience under the ambient conditions. For example, for low (dark) ambient lighting conditions, the perception of contrast decreases. This can result in an image appearing "flat". Thus the slope of the mid-tone part of the transfer function may be increased from a slope of 1:1, to a greater slope, such as a slope up to 1:1.5 or so (for example, a slope of 1.3) to increase the contrast level for dark-adapted eyes. This may be done by changing the value of the free parameter n where transfer functions of the type illustrated by Equation (1) are applied. The slope may be controlled in response to an input from an ambient light sensor.

In some embodiments a light-adaptation circuit is provided that estimates an adaptation level of the human visual system in response to inputs which may include a signal from the ambient light sensor, a signal that represents a weighted average or other indicator of the brightness of historical image content or the like. The light-adaptation circuit may be based on a model of the human visual system, for example. Various algorithms for estimating the adaptation level of the human visual system are known in the art. The light adaptation circuit may implement such algorithms in any suitable manner including software executing on one or more programmable data processors, fixed logic circuits, or combinations thereof. Values for the mid-tone contrast and/or the locations of points 57C in the transfer functions may be automatically controlled in response to an output from the light-adaptation circuit.

In some embodiments, transfer functions are set up once for a target display. The transfer functions may, for example, be built into the target display and embodied in the form of one or more programmable processors executing firmware or other software that performs mapping according to transfer functions as described above; lookup tables which implement the transfer functions described above; hard-wired or configurable logic circuits that are set up to provide output based on the transfer functions as described above; or the like.

In some embodiments, drive values for red, green and blue channels of the target display are converted to a bit depth that matches that of the display. For example, the display may use 8-bit drive values. If the transfer functions are applied using floating-point or other higher-precision calculations then the conversion may involve, for example, rounding the drive values to a closest corresponding 8-bit value.

In the foregoing embodiments, minimum and maximum luminance values for the input video data can be made to map respectively to minimum and maximum brightness values for pixels of the display. Furthermore, a selected mid-tone point from the input video signal can be made to map to a selected mid-tone point for the display. Mid-tone contrast remains a free parameter. Another feature of the transfer functions described above is that they provide compression or expansion both for low and high values while preserving local contrast in a mid-tone range.

In some embodiments, particular images (a particular video frame or sequence of video frames, for example), are relatively low average luminance (low key) whereas other images (e.g. frames or groups of frames) may be deliberately made to have a relatively high average luminance (high key). In some embodiments, information about the intended key of the image is provided in the form of metadata. The metadata may, for example, be created and associated with the image data during a color grading operation. For example, metadata may be embedded in or otherwise associated with a signal carrying color graded video data. In such embodiments, the key of the image, as indicated by the metadata, may be used in determining the mid-tone anchor point(s) used in the transfer functions. Where the metadata indicates a low key image the vertical coordinate of the anchor point may be moved to a lower value, thus recreating the key in the target display.

Different video content may be color graded for different reference displays. When following the approach described above, it can be desirable to map the content differently in any particular target display depending upon the characteristics of the reference display on which the color grading was performed. Information identifying the reference display or its characteristics may, for example, be carried in metadata embedded in or otherwise associated with image data. A target display may store parameters for a plurality of different sets of transfer functions. The different sets of transfer functions may correspond to and be used for video data that has been color timed using different reference displays.

Another feature of the example transfer functions having the form provided by Equation (1) is that the same transfer function may provide either compression or expansion at high and low ends of the range, depending upon the parameters chosen. For example, in a case where the target display has a larger luminance range than the input data then the target display may be configured with transfer functions that expand the range of the image data to match or more closely approach that of the target display.

One advantage of the methods and apparatus according to some embodiments described herein are that mapping is performed in the RGB color space of the target display. This can save very significant amounts of computation and/or reduce the complexity of hardware required to perform the mapping.

Mapping may be performed in real time.

Methods according to some embodiments provide direct control over each of: 1) the average image brightness ("adaptation point"), 2) the mid-tone local contrast (as set by the tone-curve slope), 3) the input black maps to the minimum display luminance, and 4) the input white maps to the maximum display luminance. These variables have been found to be fundamental for providing images that recreate creative intent as embodied in original image data. In example embodiments these variables explicitly correspond to separate parameters. Such methods consequently provide a simple and effective way to perform color mapping which takes original image data (which may, for example comprise high dynamic range (HDR) data and/or color-graded image data) and maps the original image data into the limited 3-dimensional gamut of a specified output display.

Color mapping methods and apparatus as described herein may also or in the alternative be used in color grading/content creation. A colorist may be provided with a filter which implements transformations as described above. The filter may have controls which allow the colorist to directly set parameters of the transfer functions. The colorist may use these controls, for example, to adjust black level etc. In some embodiments, the controls include controls that allow direct setting of one or more of: one or more coordinates for one or more of a white level anchor point, a black level anchor point and a mid-level anchor point (e.g. points 57A, 57B and 57C respectively) and a mid-level contrast (e.g. the parameter n). Such controls can allow the colorist to set the white level, black level and key without significantly affecting the mid-tone slope and vice versa.

In some embodiments, the apparatus is set to automatically determine a starting set of parameters that may be close to what the colorist intends. These starting parameters may, for example, be generated based on information characterizing the input video content (e g minimum and maximum values for pixel color/luminance coordinates) and information characterizing a target display (e.g. white level, black level and optionally metadata (e.g. metadata indicating a key of the image data being processed).

Video production involves creating different versions for displays having greater and lower capabilities. For example, Standard Dynamic Range (SDR) grading may be performed for producing video for display on legacy displays. A tool as described herein may be applied to create a SDR version of video automatically. A colorist may guide operation of the tool to produce optimized results.

Furthermore, where a colorist has set the parameters to provide a version for viewing on a lower capability display then parameters for use in performing mapping for displays having intermediate capabilities may be determined from the parameter values selected by the colorist for the lower capability display. This may be done, for example, by interpolation of the parameter values established by the colorist for displays having higher and lower capabilities than the display having intermediate capabilities.

Methods and apparatus described herein are not restricted to use in connection with professional-level color timing. Tools for color-timing are available to amateurs, and even where color-timing is performed on a non-calibrated monitor (e.g., a home computer display, television, etc.) methods and apparatus described herein may be used to translate content created on the non-calibrated monitor to another display (e.g., by estimating the capabilities of the non-calibrated color timing display). Technology as described herein also has application to signals that are not color timed.

Figure 6:
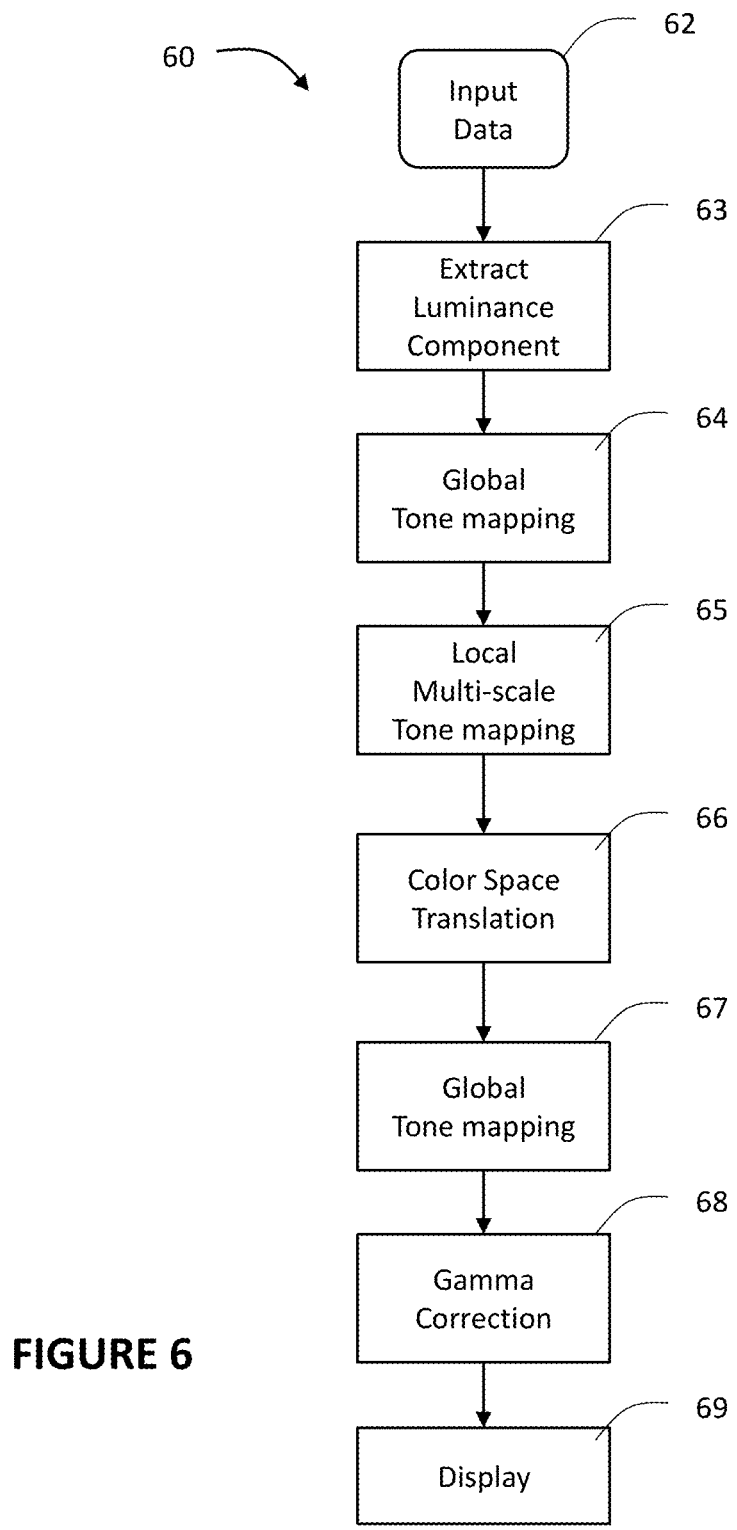
FIG. 6 depicts a flow chart illustrating a method that combines a global tone-mapping operator with a local multi-scale tone-mapping operator according to an example embodiment.

Combining a Global Tone-Mapping Operator with a Local Multi-Scale Tone-Mapping Operator Color mapping methods and apparatus as described herein may also be combined with other tone mapping techniques, e.g., local tone mapping operators (TMOs). FIG. 6 depicts an example embodiment where a global tone mapping operator as described herein is combined with a local multi-scale tone mapping operator as the one described by G. J. Ward in U.S. Provisional Application 61/448,606, "A Local Multiscale Tone-Mapping Operator," (herein to be referred to as the "Ward" reference), filed also as International Patent Application No. PCT/US2012/027267, filed on 1 Mar. 2012, incorporated herein by reference in its entirety. The example embodiment combines the predictability and stability of the global TMO with the ability to preserve highlights and color fidelity when using a local multi-scale operator (MS TMO).

As depicted in FIG. 6, method 60 starts in step 62 by accessing input image or video data. These data may be stored or transmitted in a variety of color formats, such as YCbCr, RGB, XYZ, and the like. In step 63, one may extract the luminance component, e.g., Y, from the input data. Depending on the format of the input data (e.g., RGB) this step may require a color transformation (e.g., RGB to XYZ). Step 64 may apply a global tone mapping operator 55, as described by equation (1), to the Y color component of the input data. In an example embodiment, the anchor points of global TMO 55 may be selected so that the luminance range of the input data is mapped to the range $[4*L_{dmin}, \frac{1}{2}*L_{dmax}]$, where $L_{dMin}$ and $L_{dMax}$ denote the minimum and maximum luminance of the target display. The scaling factors of 4 and ½ are typical, but adjustable.

In an example embodiment, the output of step 64 may be denoted as globally tone-mapped luminance data $Y_{TM}$. In step 65, one may apply to the $Y_{TM}$ data a local multi-scale tone-mapping operator (MS TMO) as described by "Ward". For example, first, one may compute a global Log ratio image $$R_L = \log \frac{Y_{TM}}{Y}, \quad (32)$$

defined as the logarithm of the global tone-mapped luminance data divided by the original luminance pixels. Given the global Log ratio image $R_L$, as described by Ward, the output of the MS TMO (e.g., step 65) may be a locally tone-mapped luminance image, denoted as $Y_{MS}$. Using $Y_{MS}$, one may compute $$X_{MS} = \frac{X * Y_{MS}}{Y}, \quad (33)$$

and $$Z_{MS} = \frac{Z * Y_{MS}}{Y}. \quad (34)$$

In step 66, the $X_{MS}$, $Y_{MS}$, and $Z_{MS}$ data may be converted back to $R_{MS}$, $G_{MS}$, and $B_{MS}$ ($RGB_{MS}$) data with primaries, white, and black levels determined by the target display. Negative or out of gamut $RGB_{MS}$ values may be clipped to very small positive values or may be re-mapped to in-gamut RGB values using any of the known gamut mapping algorithms.

Given in-gamut $RGB_{MS}$ data from step 66, step 67, may reapply the global tone mapping operator 55 to all of the color components to output globally tone-mapped corrected data $RGB_{G-MS}$. The application of the second global tone-mapping operation guarantees that the output of the MS TMO is in the range of the target display. Finally, in step 68, before displaying the image data (step 69), the $RGB_{G-MS}$ data may be gamma corrected as needed for the output display.

Certain implementations of the invention comprise computer processors which execute software instructions which cause the processors to perform a method of the invention. For example, one or more processors in a display, a color grading station, a set top box, a transcoder or the like may implement image data transformation methods as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Some non-limiting embodiments may (e.g., depending on circumstances) provide one or more of the following advantages:
- mapping according to a tone mapping curve with a black point anchor may avoid excessive tonal compression of dark input content;
- mapping according to a tone mapping curve with black point and/or white point anchors may utilize more of the luminance range of a target display than a tone mapping according to a curve without one or both of such anchor points;
- color channel specific mapping functions that maximize luminance range may be applied in the RGB color space of a target display (e.g., after conversion from an input color space to the target display RGB color space); and
- white point, brightness and/or mid-contrast of output video data for a target display may be adjusted in the transfer function (e.g., instead of before or after mapping according to a transfer function).

Some embodiments may not provide any of the above advantages; some embodiments may provide different advantages (e.g., rather than or supplementary to the above advantages).

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method to improve display management of images, the method comprising:
    receiving first information data for input video data, the first information data comprising a minimum luminance level, a maximum luminance level, and an average luminance level for the input video data;
    accessing second information data for a target display, the second information data comprising a black point level, a white point level, and a mid-point level for the target display;
    determining a transfer function to map pixel values of the input video data to corresponding pixel values of output image data using the first and second information data, wherein the transfer function comprises three anchor points, wherein the first anchor point is determined using the minimum luminance level of the input video data and the black point level of the target display, the second anchor point is determined using the maximum luminance level of the input video data and the white point level of the target display, and the third anchor point is determined using an average luminance level for the input video data and the mid-point level of the target display; and
    mapping the input video data to the output image data using the determined transfer function.

2. The method of claim 1, wherein determining the transfer function further comprises applying a free parameter, wherein the free parameter adjusts the slope of the transfer function at the third anchor point.

3. The method of claim 1, wherein the first information data is received as part of metadata of the input video data, wherein the metadata is transmitted by an image encoder to a decoder.

4. The method of claim 1, wherein the first anchor point has horizontal and vertical coordinates respectively equal to the minimum luminance level of the input video data and the black point level of the target display, the second anchor point has horizontal and vertical coordinates respectively equal to the maximum luminance level of the input video data and the white point level of the target display, and the third anchor point has horizontal and vertical coordinates respectively equal to the average luminance level for the input video data and the mid-point level of the target display.

5. The method of claim 1, wherein the transfer function comprises a transformation according to:

$$V' = \frac{C_1 + C_2 V^n}{1 + C_3 V^n}$$

wherein V denotes an input pixel value, V' denotes an output pixel value, $C_1$, $C_2$, and $C_3$ are parameters determined using the three anchor points, and n denotes a free parameter.

6. The method of claim 1, wherein the pixel values of the input video data comprise color values for two or more color components, and the transfer function is determined for each one of the two or more color components.

7. The method of claim 1, wherein the first information data is received for a frame of the input video data.

8. The method of claim 1, wherein the first information data is received for a scene of the input video data.

9. The method of claim 1, wherein the maximum luminance level of the input video data is higher than the white point level of the target display.

10. The method of claim 1, wherein the maximum luminance level of the input video data is lower than the white point level of the target display.

11. The method of claim 1, wherein the minimum luminance level of the input video data is higher than the black point level of the target display.

12. The method of claim 1, wherein the minimum luminance level of the input video data is lower than the black point level of the target display.

13. An apparatus comprising a processor and configured to perform the method recited in claim 1.

14. A non-transitory computer-readable storage medium having stored thereon computer-executable instruction for executing a method with one or more processors in accordance with claim 1.

* * * * *